United States Patent
Toyama et al.

(10) Patent No.: US 7,123,254 B2
(45) Date of Patent: Oct. 17, 2006

(54) METHOD OF AND DEVICE FOR MODIFYING STANDARD MODEL

(75) Inventors: Osamu Toyama, Kakogawa (JP); Eiro Fujii, Takatsuki (JP); Tomasz Kowalczyk, Providence, RI (US); Shinichi Horita, Osaka (JP)

(73) Assignee: Minolta Co., Ltd., Osaka (JP)

( * ) Notice: Subject to any disclaimer, the term of this patent is extended or adjusted under 35 U.S.C. 154(b) by 1009 days.

(21) Appl. No.: 09/893,897

(22) Filed: Jun. 29, 2001

(65) Prior Publication Data

US 2002/0013684 A1 Jan. 31, 2002

(30) Foreign Application Priority Data

| Jun. 30, 2000 | (JP) | ............................. 2000-197775 |
| Jun. 30, 2000 | (JP) | ............................. 2000-197776 |
| Jun. 30, 2000 | (JP) | ............................. 2000-197777 |

(51) Int. Cl.
*G06T 15/00* (2006.01)

(52) U.S. Cl. ...................... 345/419; 345/426; 707/526; 358/357

(58) Field of Classification Search ................ 345/419, 345/422, 426, 600; 707/526; 358/357; 382/303
See application file for complete search history.

(56) References Cited

U.S. PATENT DOCUMENTS 5,142,616 A * 8/1992 Kellas et al. ................ 345/634
5,267,154 A * 11/1993 Takeuchi et al. ............. 345/473
6,304,277 B1 * 10/2001 Hoekstra et al. ............. 345/600

FOREIGN PATENT DOCUMENTS

| JP | 61-125686 | 6/1986 |
| JP | 4-289976 | 10/1992 |
| JP | 5-81377 | 4/1993 |
| JP | 6-52289 | 2/1994 |
| JP | 6-118349 | 4/1994 |
| JP | 8-77389 | 3/1996 |
| JP | 10-206132 | 8/1998 |

\* cited by examiner

*Primary Examiner*—Phu K. Nguyen
(74) *Attorney, Agent, or Firm*—McDermott Will & Emery LLP

(57) ABSTRACT

The invention provides a method for generating a three-dimensional model by modifying a standard model based on measured data without causing a topical improper modification. In the method, it is decided whether to further modify the standard model or to finish the modification of the standard model based on integrated evaluation of two or more functions selected from a first function relating to a distance between the standard model and the measured data, a second function relating to a distance between a characteristic point defined on the standard model and a characteristic point specified on the measured data and corresponding to the characteristic point defined on the standard model and a third function relating to a distance between an outline defined on the standard model and an outline specified on the measured data and corresponding to the outline on the standard model.

6 Claims, 17 Drawing Sheets

F I G. 1
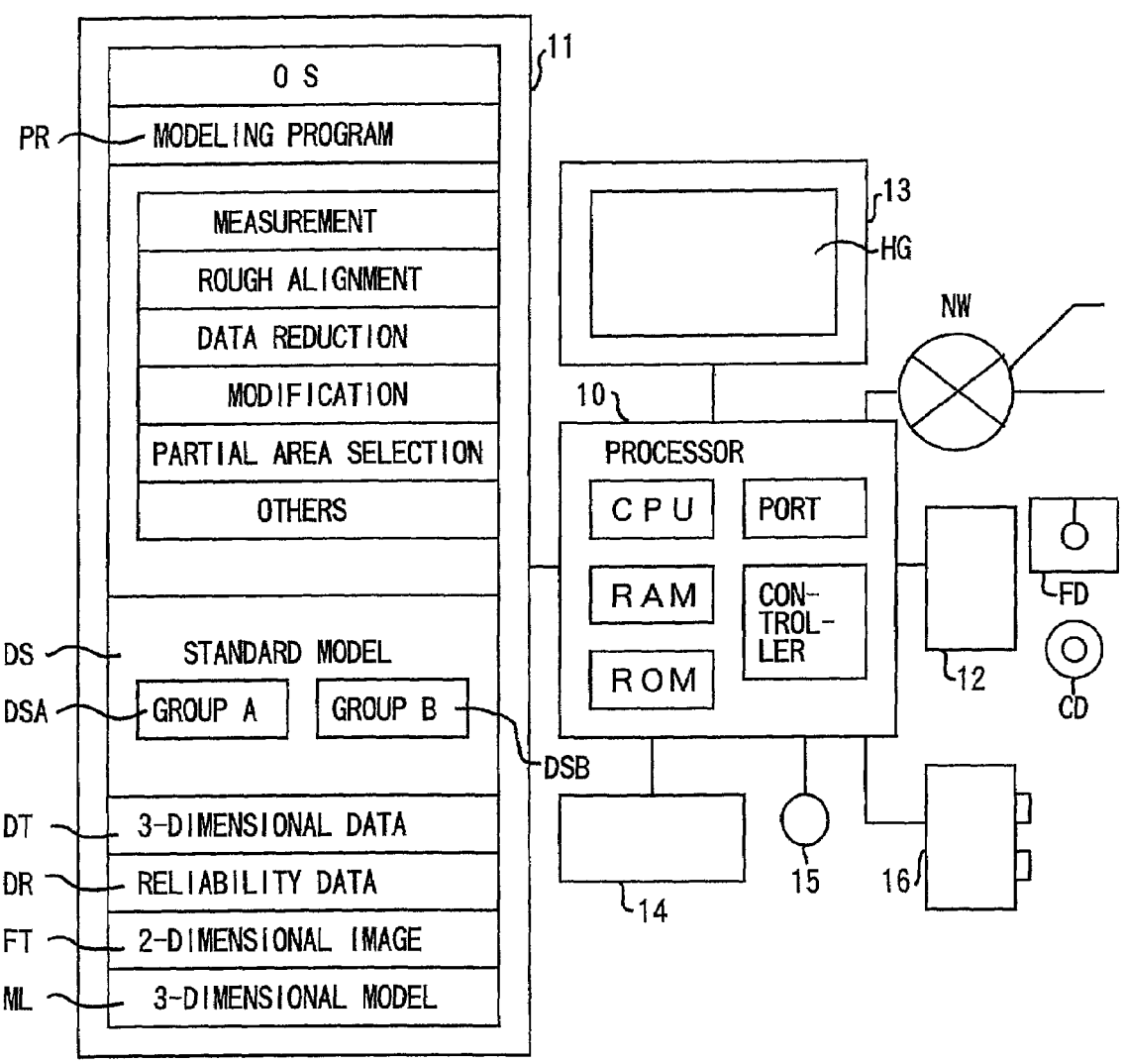

F I G. 4
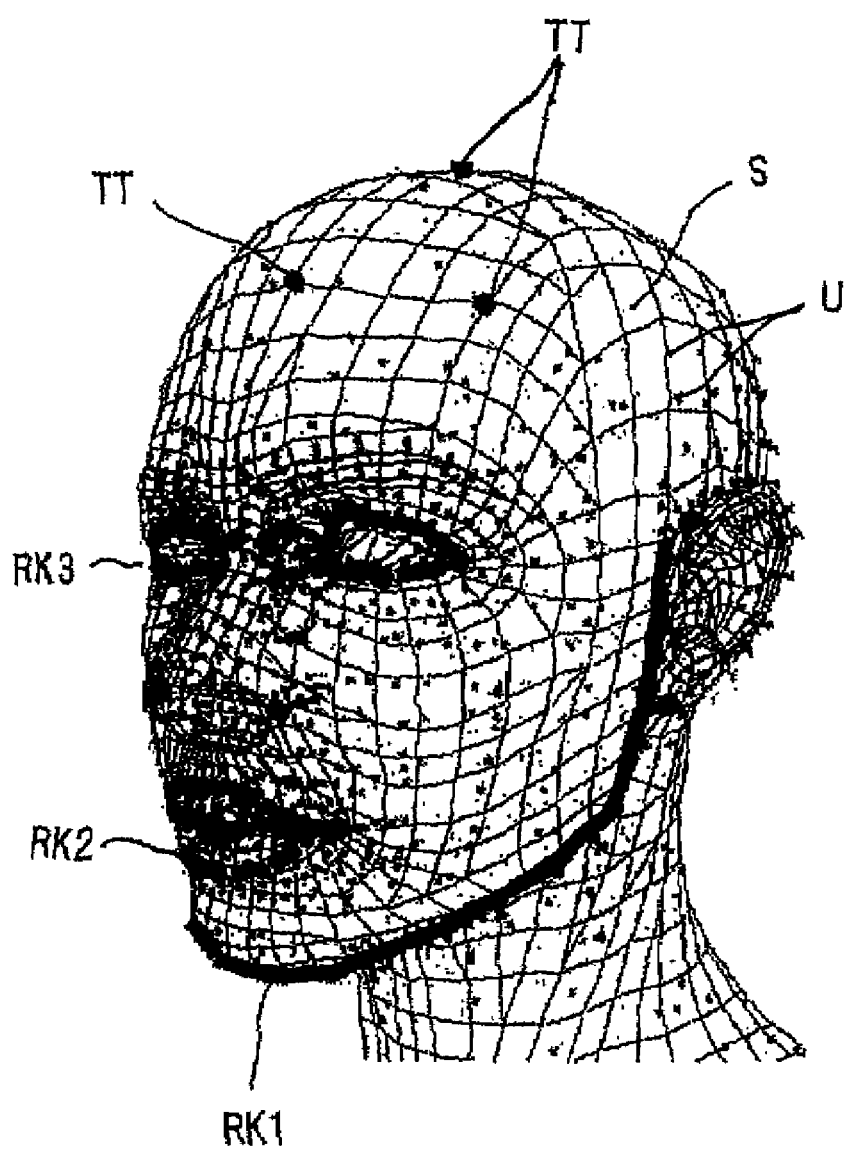

F I G. 8
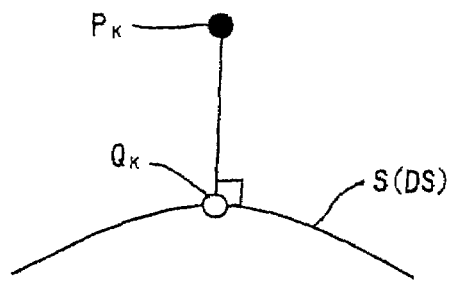
F I G. 9
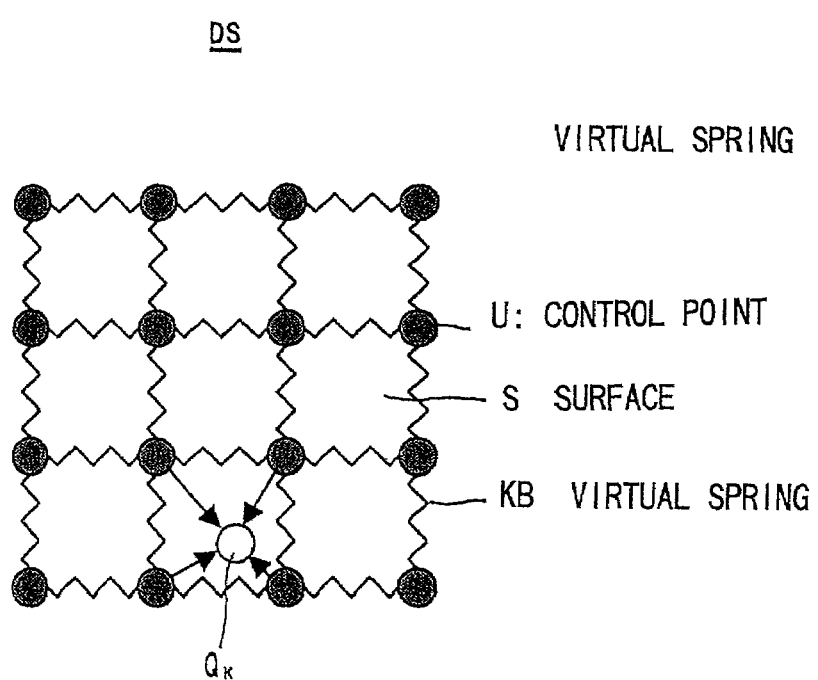

F I G. 1 9
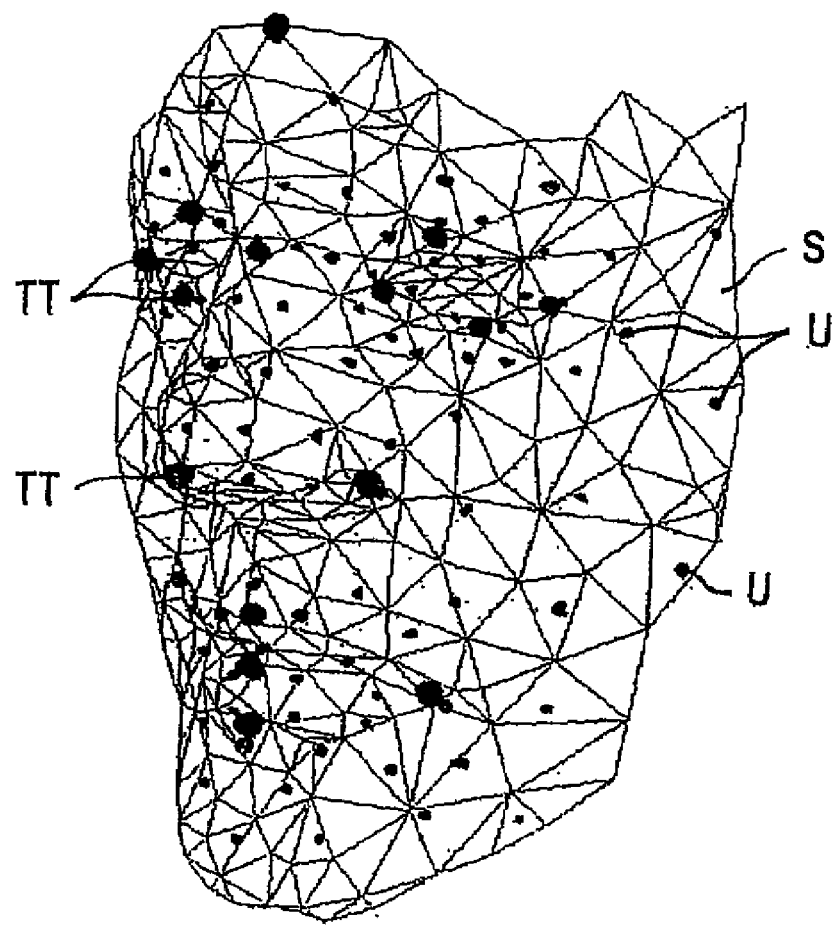

DSL1

METHOD OF AND DEVICE FOR MODIFYING STANDARD MODEL

This application is based on Japanese patent applications Nos. 2000-197775, 2000-197776 and 2000-197777 filed in Japan, the contents of which are hereby incorporated by reference.

BACKGROUND OF THE INVENTION

1. Field of the Invention

The present invention relates to a method and a device for modifying a standard model. The invention is useful for generating a three-dimensional model in the field of computer graphics, for example.

2. Description of the Prior Art

In recent years, the three-dimensional CG (three-dimensional computer graphics) technique is often used in the fields of movies, games and so on. In the three-dimensional CG, a three-dimensional model, a light source, etc. are located and moved in a virtual three-dimensional space; therefore, the three-dimensional CG is high in the degree of freedom of expression.

Conventionally, a non-contact three-dimensional measurement device employing the light-section method has been put into practical use. Three-dimensional data of an object can be relatively easily obtained by using such non-contact three-dimensional measurement device. However, various problems have been detected in using the three-dimensional data obtained by means of the non-contact three-dimensional measurement device as it is for three-dimensional CG. For example, it is necessary to reduce the amount of data obtained by the measurement by a process of thinning the data, which is complicated and time-consuming.

To solve the above problems, there has been proposed a method wherein a standard model is prepared for an object and the standard model is modified in accordance with three-dimensional data of the object obtained by an actual measurement of the object (Japanese Unexamined Patent Publication No. 5-81377).

In the above-mentioned method, three-dimensional shape information of the three-dimensional data obtained by the measurement, i.e., a point group (a group of points) in the three-dimensional space, is used as an object for fitting, and a surface of the standard model is fitted on the three-dimensional point group.

Although a general shape of an object can be reproduced according to the above method, it is difficult to reproduce topical characteristics of a shape of the object.

For example, in the case of making a three-dimensional model of a human head according to the above method, although a general shape of the resulting three-dimensional model conforms to an object for measurement, i.e., the human head, parts that influences much for expression of the face such as eyes, mouth and the like do not satisfactorily conform to those of the object. Thus, it has been difficult to represent delicate expressions of a human.

Further, when two-dimensional image information is used for reproducing an outline, characteristics, etc. of a face, a topical modification occurs in the standard model thereby causing an improper modification.

For generating a three-dimensional model of human head, a preformed standard model of human head is typically fitted to three-dimensional shape data obtained by measuring a human head.

Human head, in general, consists of a face and hair. Three-dimensional measurement of the face is easy, while that of the hair is difficult. Accordingly, there is a problem in the above-mentioned fitting of the standard model that a part of the hair does not fit to the three-dimensional shape data satisfactorily.

In the aforementioned prior art, operations for modifying a surface of the standard model in accordance with measured three-dimensional points are time-consuming due to the large quantity of data to be operated.

If number of the three-dimensional points is decreased for the purpose of data reduction, a three-dimensional model to be generated is low in precision with making it difficult to express delicate expressions of a human. On the other hand, if the number of the three-dimensional points is increased too much, a topical modification may occur in fitting a standard model, thereby degrading a shape as a whole.

SUMMARY OF THE INVENTION

An object of the present invention is to provide a method for generating a shape model that enables to have a part of a three-dimensional model such as a corner of an eye or a corner of a mouth conformed to that of an object without topical improper modification.

Another object of the present invention is to perform a satisfactory fitting of a hair part or the like in the case of generating a three-dimensional model of human head.

Still another object of the present invention is to shorten a time required for operations and to reproduce a topical shape of an object with high precision at the same time with reproducing a shape as a whole of the object.

According to an embodiment of the present invention, a method of modifying a standard model based on measured data comprises the steps of modifying the standard model in accordance with the measured data and deciding whether to further modify the standard model or to stop modification based on an over-all judgment obtained by using two or more functions selected from a first function relating to a distance between the standard model and the measured data, a second function relating to a distance between a characteristic point defined on the standard model and a characteristic point specified on the measured data which is a point corresponding to the characteristic point on the standard model and a third function relating to distance between an outline defined on the standard model and an outline specified on the measured data which is an outline corresponding to the outline on the standard model.

According to another embodiment of the present invention, a method of modifying, based on measured data, a first standard model and a second standard model which are joined each other on a corresponding point or a corresponding line comprises the steps of obtaining measured data by three-dimensional measurement; modifying the first standard model in accordance with the measured data; and modifying the second standard model so that the second standard model is joined to the first standard model using positional information of the corresponding point or the corresponding line of the modified first standard model.

According to still another embodiment of the present invention, a method of modifying a standard model based on measured data comprises the steps of modifying a low resolution standard model which is a model corresponding to the standard model and has a resolution lower than that of the standard model in accordance with the measured data; and modifying the standard model based on the modification of the low resolution standard model.

These and other characteristics and objects of the present invention will become more apparent by the following descriptions of embodiments with reference to drawings.

BRIEF DESCRIPTION OF THE DRAWINGS

FIG. 1 is a block diagram showing a modeling device according to a first embodiment of the present invention.

FIG. 4 shows an example of a standard model.

FIG. 8 schematically shows a surface of a standard model and a point of three-dimensional data.

FIG. 9 illustrates a virtual spring for preventing a standard model from improper modification.

FIG. 19 shows an example of a simplified model.

DESCRIPTION OF THE PREFERRED EMBODIMENTS

Figure 2:
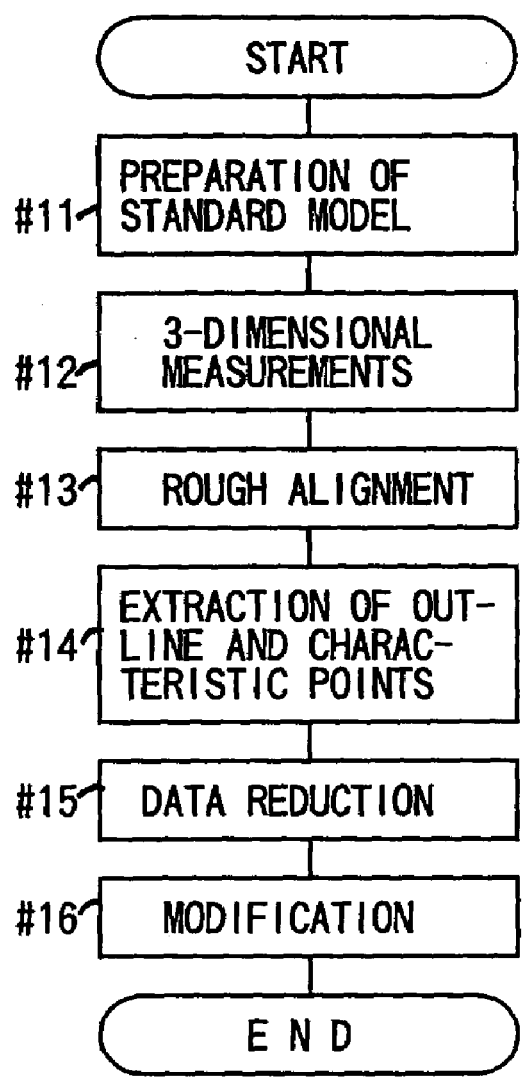
FIG. 2 is a flowchart of a general processing of the modeling device.

In this specification, "fitting" means a modification of a standard model or a series of processings including the modification. As an object for the fitting, a construction point itself, an outline, a characteristic point or the like of measured data may be used.

[First Embodiment]

FIG. 1 is a block diagram showing a modeling device according to a first embodiment of the present invention.

There will be explained an example of generating a three-dimensional model of a human head by modifying (fitting) a standard model based on measured data of the human head (three-dimensional data or a two-dimensional image).

Specifically, according to the first embodiment, there will be explained an example of modifying the standard model to have topical parts of the standard model such as a corner of an eye or a corner of a mouth fit well without occurrence of topical improper modification.

Referring to FIG. 1, a modeling device 1 comprises a processor 10, a magnetic disc unit 11, a media drive unit 12, a display unit 13, a key board 14, a mouse 15, a three-dimensional measuring unit 16 and so on.

The processor 10 comprises a CPU, a RAM, a ROM, a video RAM, an input and output port, various controllers and so on. The CPU executes programs memorized in the RAM and the ROM to thereby realize various functions on the processor 10.

Stored in the magnetic disc unit 11 are an OS (Operating System), a modeling program PR for generating a three-dimensional model ML, other programs, a standard model (standard model data) DS, three-dimensional data (three-dimensional shape data) DT, reliability data DR for indicating reliability of the three-dimensional data DT, a two-dimensional image (two-dimensional measured data) FT, a generated three-dimensional model ML, other data and the like. These programs and data are loaded onto the RAM of the processor 10 as required.

The modeling program PR includes programs for measurement, rough alignment, data reduction, modification, partial area selection and other processing.

The media drive unit 12 serves to access a recording medium such as a DC-ROM (CD), a floppy disk FD or a magneto-optic disk and to read and write data or programs. Driving unit to be used may be selected depending on the type of the recording medium. The modeling program PR can be installed from the recording medium. It is also possible to input the standard model DS, three-dimensional data DT, reliability data DR, two-dimensional image FT and the like via the recording medium.

Displayed on a display screen HG of the display unit 13 are above-mentioned various data, the three-dimensional model ML generated by means of the modeling program PR and other data (images).

The keyboard 14 and the mouse 15 are used for inputting data or issuing command to the processor 10.

The three-dimensional measuring unit 16 serves to obtain three-dimensional data DT of an object by, for example, the light-section method. It is possible to obtain three-dimensional data DT directly by using the three-dimensional measuring unit 16, while it is also possible to obtain three-dimensional data DT indirectly by using the processor 10 or the like and performing operations based on data output from the three-dimensional measuring unit 16.

It is possible to obtain, in the course of obtaining three-dimensional data DT of an object, two-dimensional image FT of the object on the same visual line as that of the three-dimensional data DT, when so required. A known device such as that disclosed in Japanese Unexamined Patent Publication No. 10-206132 can be used as the three-dimensional measuring unit 16.

Another known method for obtaining three-dimensional data DT of an object is a method wherein a plurality of cameras is located with parallax for an object. Specifically, the three-dimensional data DT is obtained by computing a plurality of images with parallax captured by the cameras and using the stereophotography method.

In the above method, data for judging reliability of respective points of the three-dimensional data DT can be obtained by using three cameras.

More specifically, an object is captured by three cameras to obtain three images, and points corresponding to the three images are determined. The three-dimensional data DT is then obtained from a known calculation method based on the corresponding points of two images out of the three images. Rest of the images is utilized for obtaining the reliability data DR.

Figure 10:
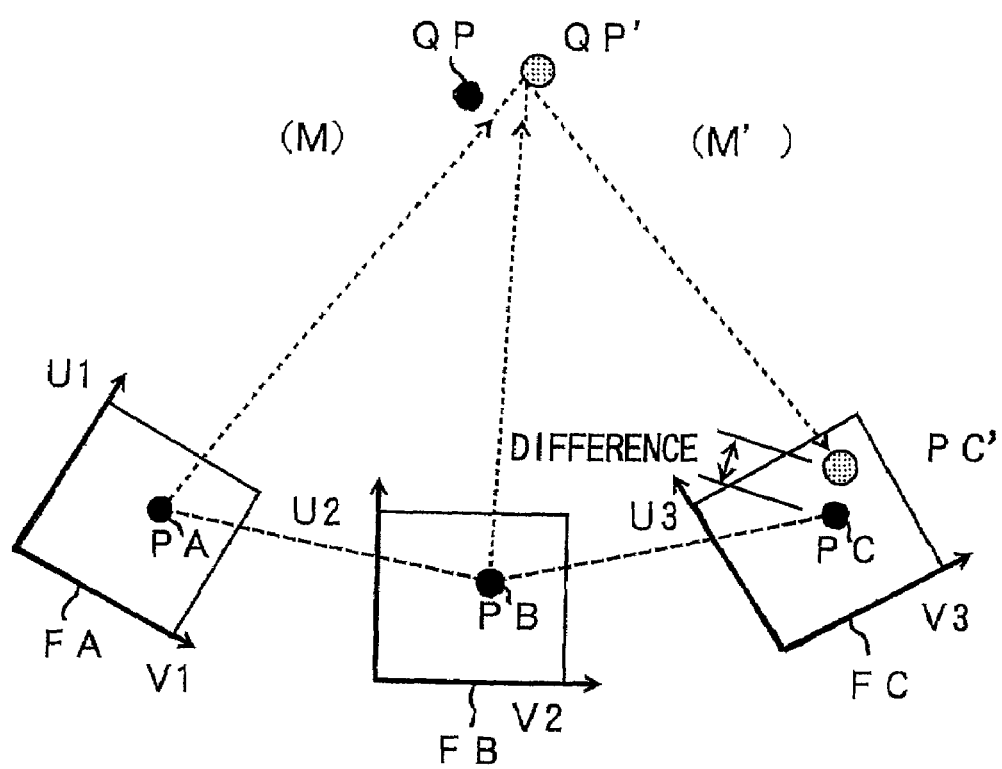
FIG. 10 is an example of a method of obtaining three-dimensional data and reliability data of an object.

For example, as shown in FIG. 10, three-cameras A, B and C capture the object Q to obtain three images FA, FB and FC. Image planes (Un, Vn; n=1, 2, 3) are indicated for the images FA, FB and FC. The point QP on the object Q in the three-dimensional space M is projected on each of the points PA, PB and PC of the image planes.

Here, if the relationship of the points PA, PB and PC is determined, the three-dimensional space M' can be reconstructed from the relationship. In the three-dimensional space M',the point QP' which corresponds to the points PA and PB is determined. Logically, the point PC' obtained by reversal projection of the QP' in the three-dimensional space M' on the image plane (U3, V3) is identical to the point PC obtained by projecting the point QP in the three-dimensional space M on the image plane (U3, V3).

However, since it is difficult to precisely determine the projection conversion and the relationship, the points typically are not identical to each other. Therefore, the difference between the point PC and the point PC' is used as an index for the reliability.

For example, the difference between the point PC and the point PC' may be indicated by number of different pixels. If the point PC and the point PC' are on the same pixel, the difference is "0". If the points are different to each other with respect to one pixel, the difference is "1"; and if the points are different with respect to two pixels, the difference is "2". The number of different pixels thus can be used as the reliability data DR.

The reliability data DR may be judged by other methods such as that disclosed in Japanese Unexamined Patent Publication No. 61-125686.

Referring to FIG. 1, the modeling device 1 may be provided by using a personal computer, a workstation or the like. It is possible to obtain the program and data mentioned above by receiving them via the network NW.

Hereafter, general flow of processing in the modeling device 1 will be illustrated with reference to the following flowcharts.

Figure 3:
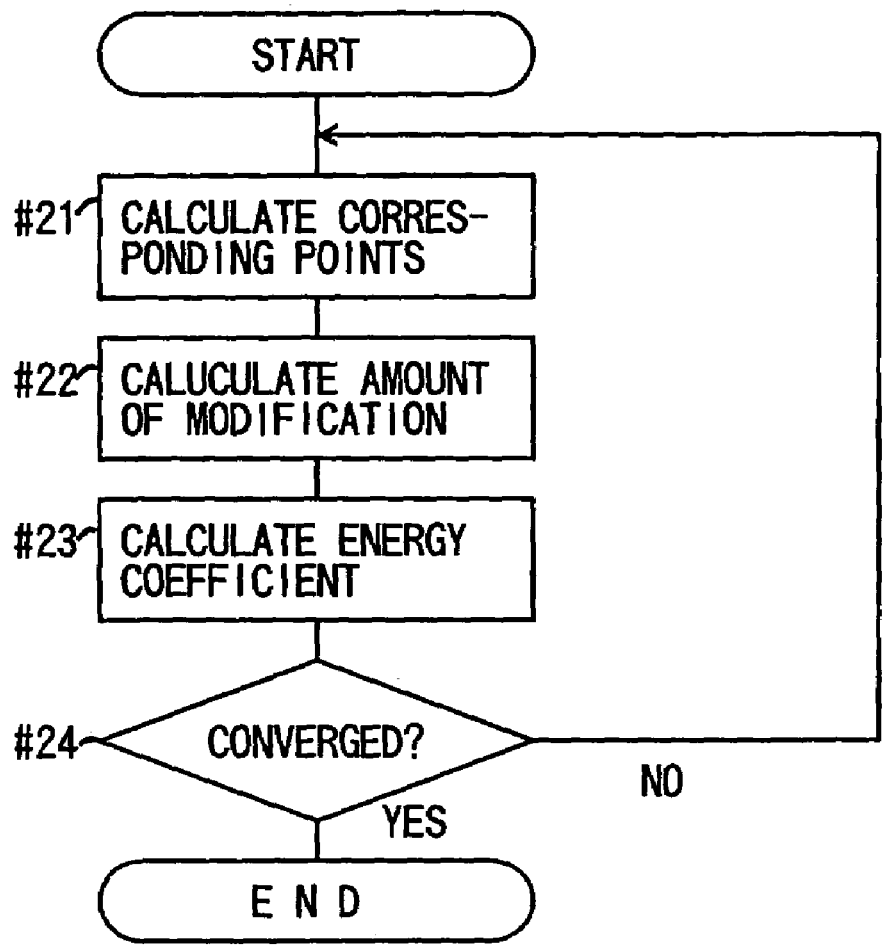
FIG. 3 is a flowchart showing a modification process.
Figure 5:
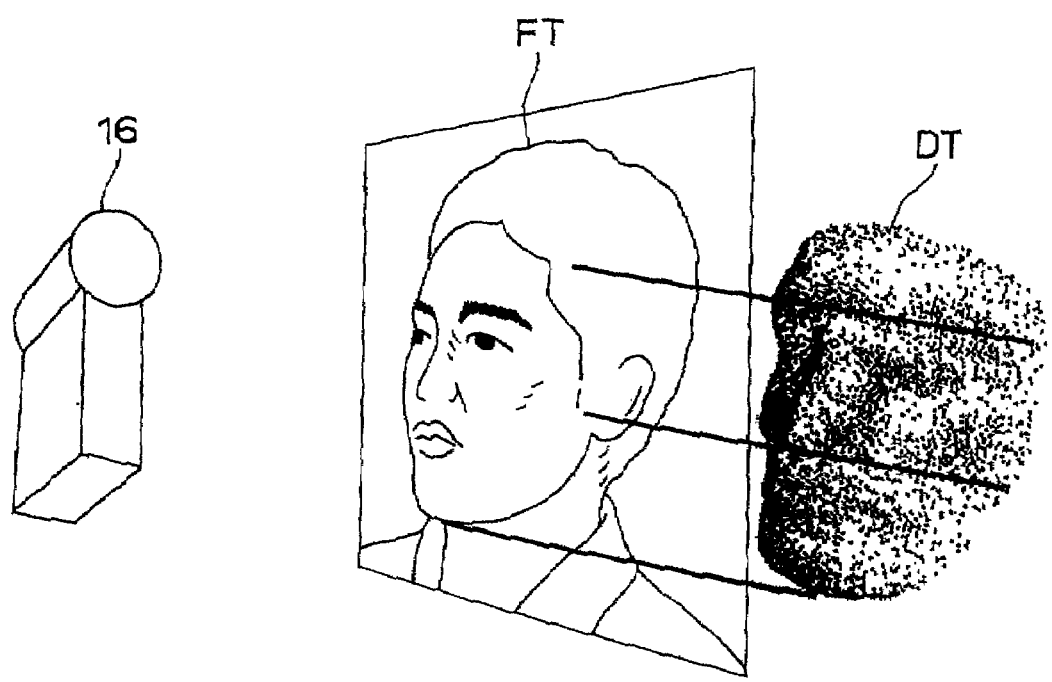
FIG. 5 shows an example of obtaining three-dimensional data from an object.
Figure 6A:
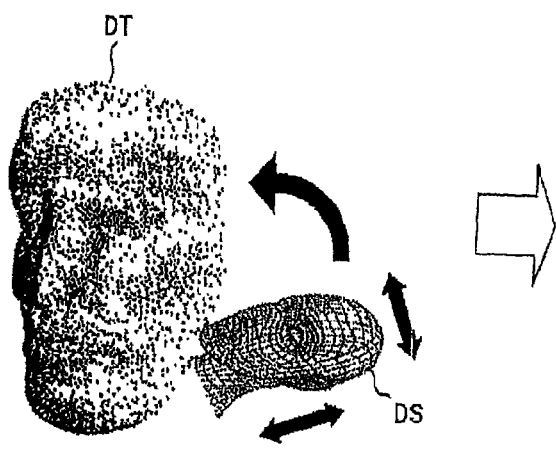
FIG. 6 shows an example of rough alignment.
Figure 6B:
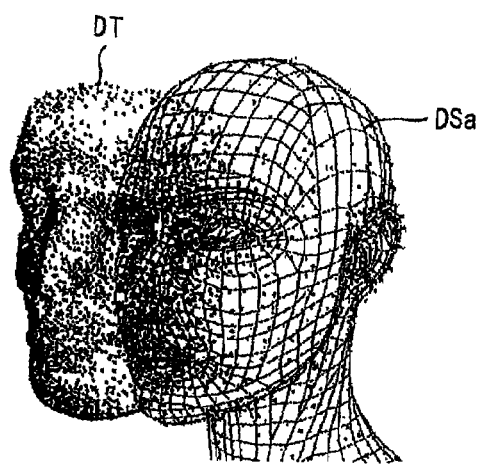
Figure 7:
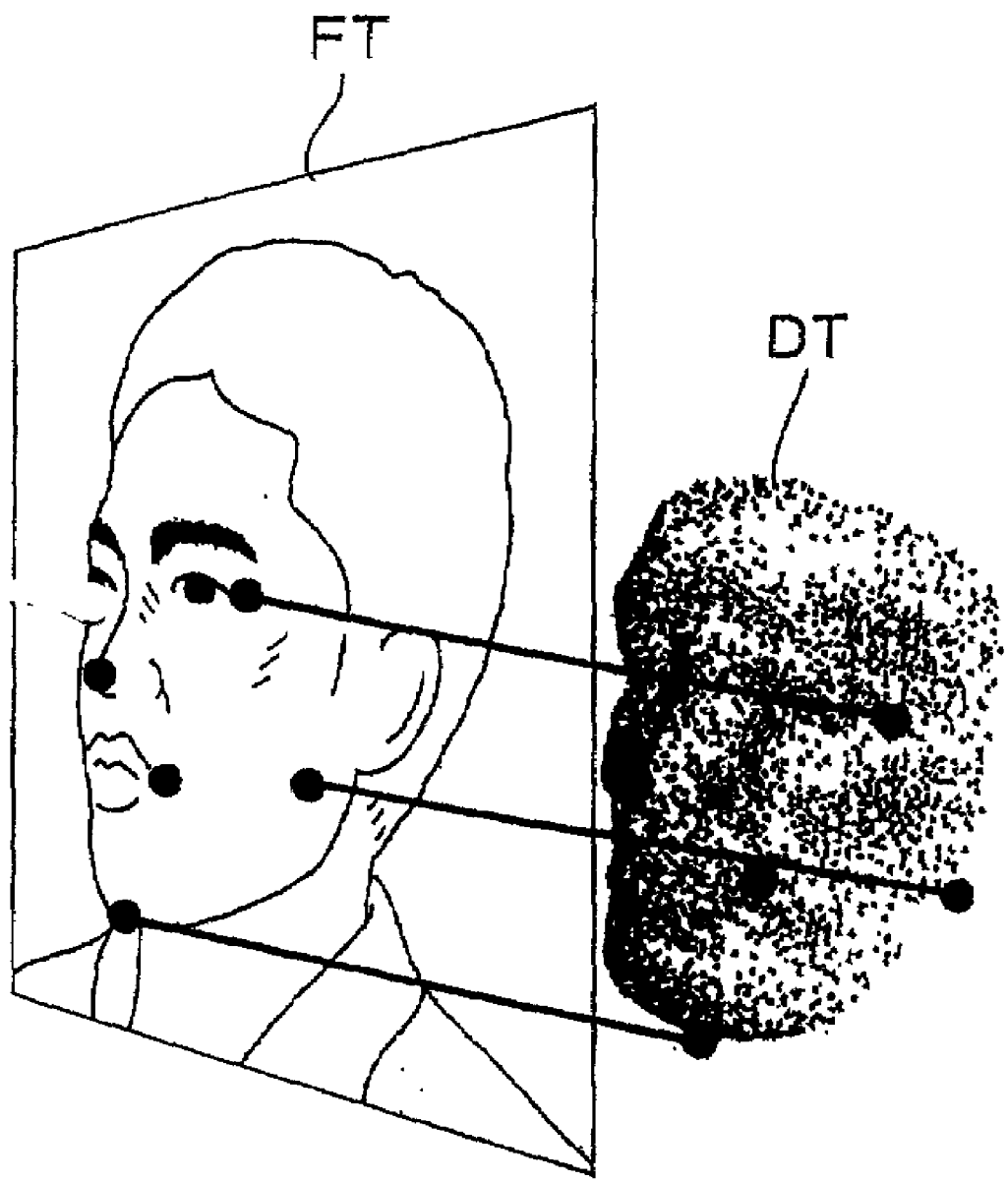
FIG. 7 shows an example of extraction processing of an outline and characteristic points.

FIG. 2 is a flowchart showing a general processing in the modeling device 1; FIG. 3 is a flowchart showing a modification processing; FIG. 4 shows an example of standard model DS1; FIG. 5 shows an example of obtaining three-dimensional data DT from an object; FIGS. 6A and 6B generally show an example of rough alignment; FIG. 7 shows an example of extraction processing of an outline and control points; FIG. 8 schematically shows surface S of standard model DS and point P of three-dimensional data DT; FIG. 9 illustrates a virtual spring for preventing a improper modification of standard model DS; and FIG. 10 illustrates an example of a method for obtaining three-dimensional data DT and reliability data DR of an object.

[Preparation for Standard Model]

Referring to FIG. 2, to start with, a standard model of an object is prepared (#11). Since the object is a human head in the present embodiment, a standard model that is most resembles to the object is chosen among a plurality of standard models having various sizes and shapes to be a standard model DS1.

The standard model may be either a three-dimensional shape model defined by polygons or a three-dimensional shape model defined by free-form surfaces. In the case where the standard model is the three-dimensional shape model defined by polygons, the standard model has a shape depending on three-dimensional coordinates of vertexes of the polygons. In the case where the standard model is the three-dimensional shape model defined by free-form surfaces, the standard model has a shape depending on functions that define the free-form surfaces and coordinates of control points.

Further, in the case where the standard model is the three-dimensional shape model defined by polygons, the vertex of polygon is referred to as "construction point" in this specification.

A point used for modifying a standard model in fitting the standard model is referred to as "control point" in this specification. Positional relationship of the control point and the construction point is arbitrary, and the control point may be set either on a surface of a polygon or away from a surface of a polygon. Single control point is associated with a plurality (about 3 to 100) of construction points, so that the associated construction points move in accordance with movement of the single control point. A plurality of the control points are moved to modify whole parts of the standard model in fitting the standard model. In the case where the three-dimensional shape model is defined by free-form surfaces, allocation of control points to be used for fitting is arbitrary.

The control points are located at a high density at a part having a delicate form such as a corner of an eye and an edge of a lip or a part having a steep and jagged form such as the nose and lips. The control points are located uniformly at other parts.

On the standard model, there are set outlines and a characteristic point as viewed from one direction. The outlines are set for the eyes, nose, mouth, jaw and the like, respectively. Examples of the outlines include an eyelid outline, a nose outline, a lip outline, a jaw outline and the like. Examples of the characteristic points include corners of the eyes or mouth, top of the nose, bottom of the jaw and like parts that actually are characteristic and parts which are not characteristic but can easily be specified as being at an intermediate part of the characteristic parts.

Referring to the standard model DS1 shown in FIG. 4, RK1 denotes the jaw outline, RK2 denotes the lip outline and RK3 denotes the eyelid outline. As shown in FIG. 4, the outline RK1 is a boundary when the standard model DS1 is viewed from one direction. Only a part of the characteristic points TT of the standard model DS1 is shown in FIG. 4.

[Obtaining of Three-Dimensional Data]

The three-dimensional data DT is obtained by performing three-dimensional measurements of an object in the step #12. As mentioned above, at the same time with obtaining the three-dimensional data, two-dimensional image, reliability data for indicating reliabilities of points of the three-dimensional data DT and information for obtaining the reliability data.

Referring to FIG. 5, head of a person is measured (captured) as an object by using the three-dimensional measuring unit 16, to thereby obtain the three-dimensional data and the two-dimensional image.

The three-dimensional data and/or the two-dimensional image are/is sometimes referred to as "measured data" in this specification. Order of performing the preparation for standard model and the obtaining of the three-dimensional data is not crucial, and the preparation for standard model and the obtaining of the three-dimensional data may be performed in parallel.

[Rough Alignment]

The standard model and the three-dimensional data are roughly aligned in the step #13. In order to align the standard model and the three-dimensional data, orientation, size and location of the standard model are changed. The standard model is magnified in the directions X, Y and Z respectively at an arbitrary magnification, so that the size of the standard model in the directions becomes equal to that of the three-dimensional data.

It is possible to obtain the standard model DSa shown in FIG. 6A, which has nearly the same size as the three-dimensional data DT, by rotating and magnifying the standard model DS shown in FIG. 6B. In FIGS. 6A and 6B, the standard model and the three-dimensional data are not aligned for the convenience of understanding.

There are practically three methods of alignment; namely, (1) general rough alignment, (2) topical rough alignment and (3) repetitive rough alignment as explained below.

Methods (1) and (3) can be performed automatically. Part of method (2) should be manually performed, since it is difficult to perform extraction of characteristic points, which is one of the steps included in method (2). Methods (1) and (3) are suitable in the case where the sameness of the shapes weighs heavily. Method (2) is suitable in the case where sameness of locations is rated above the sameness of shapes such as in animation production from the viewpoint that the standard model is modified topically in the fitting after the rough alignment. Time for the alignment process is effectively shortened by employing method (2) if a user is familiar with the extraction of characteristic points.

[General Rough Alignment]

In the general rough alignment, location, orientation and size of the standard model is changed so as to minimize distance between the three-dimensional data and the standard model.

More specifically, there are determined si, αi and ti when energy function e(si, αi, ti) indicated in the following expression (1) is the smallest.

In the expression, f(si, αi, ti) is an energy function defined in association with the distance between the three-dimensional data and the standard model, and g(si) is a stabilizing energy function for avoiding an excessive modification.

Initial values of the location, direction and size of the standard model may be obtained by performing pattern matching on two-dimensional image obtained at the same time with obtaining the three-dimensional data by means of the three-dimensional measuring unit 16.

$$e(si,\alpha i,ti)=f(si,\alpha i,ti)+g(si) \quad (1)$$

$$f(si, \alpha i, ti) = \sum_k (d_k(si, \alpha i, ti))^2$$

$$g(si) = \frac{w_{sc}}{s_0}\{(s_1 - s_0)^2 + (s_2 - s_0)^2 + (s_3 - s_0)^2\}$$

wherein,

K: number of construction points of three-dimensional data;

$d^k$: distance between construction point of three-dimensional data and standard model;

Wsc: weight parameter for stabilizing magnification;

S0: initial scale,

Si: amount of magnification in each direction (S3 is a depth);

αi: amount of rotation of standard model in each direction; and ti: amount of movement of standard model in each direction.

Here, the construction points on the standard model move in accordance with the following expression (2) and distances between the construction points and the surface of the standard model change in accordance with the movements.

$$M_k(si,\alpha i,ti,\chi)=Q_{r3}Q_{r2}Q_{r1}Q_s\chi+t \quad (2)$$

χ: coordinate of point of object for modification t: movement vector, t=[t$_1$,t$_2$,t$_3$]

$Q_{ri}$: rotation matrix of $\chi_i$ axis, $$Q_{ri} = \begin{bmatrix} 1 & 0 & 0 \\ 0 & \cos\alpha_1 & \sin\alpha_1 \\ 0 & -\sin\alpha_1 & \cos\alpha_1 \end{bmatrix}$$

and so on.

Qs: magnification matrix, $$Qs = D\begin{bmatrix} s_1 & 0 & 0 \\ 0 & s_2 & 0 \\ 0 & 0 & s_3 \end{bmatrix} D^T$$

D: conversion matrix from global coordinate.

When the three-dimensional measuring unit 16 performs measurements (capturing) from only one direction, magnification in the depth direction (direction Z) sometimes cannot be precisely measured. In this case, the magnification in the direction Z can be corrected by using magnifications in directions X and Y (S1 and S2), as indicated by the following expression (3), with considering the shape of the three-dimensional data and the shape of the standard model does not differ largely.

$$e(si,\alpha i,ti)=f(si,\alpha i,ti)+g(si) \quad (3)$$

$$f(si, \alpha i, ti) = \sum_k d_k^2$$

$$g(si) = \frac{w_{sc}}{s_0}\left\{(s_1 - s_0)^2 + (s_2 - s_0)^2 + \gamma\left[s_3 - \frac{1}{2}(s_1 + s_2)\right]^2\right\}$$

wherein,

γ: weight parameter with respect to modification in the visual line direction x3.

[Topical Rough Alignment]

In the case where the automatic alignment performed in the general rough alignment as mentioned above is not successful, the alignment should be performed manually. The topical rough alignment herein explained is a method for simplifying the manual alignment as possible. Unsuccessful automatic alignment should be reset for performing the manual alignment from the start.

In the topical rough alignment, correspondences between the characteristic lines or points on the three-dimensional data and the characteristic lines or points on the standard model are detected, and location, direction and size of the standard model are changed in order to minimize distances between them. In the case where correspondences between two lines are detected, perpendicular lines are drawn from a point on one line to another line and points that forms the shortest perpendicular line are set as characteristic points.

Specifically, ti, αi and si of the standard model are determined in such a manner that the energy function E(si, αi, ti) represented by the expression (4) becomes the smallest with respect to a distance between a characteristic point on the three-dimensional data and the corresponding characteristic point on the standard model.

$$E(si, \alpha i, ti) = \sum_{k} |M_k(si, \alpha i, ti, \chi) - c_k|^2 \qquad (4)$$

wherein, k: number of corresponding characteristic points;

$M_k$: characteristic points on standard model after alignment;

x: characteristic points on standard model before alignment;

$C_k$: characteristic points on three-dimensional data;

si: amount of magnification of standard model in each direction;

αi: amount of rotation of standard model in each direction; and ti: amount of movement of standard model in each direction.

When the three-dimensional measuring unit 16 performs measurements (capturing) from only one direction, a scale in the depth direction (direction Z) sometimes cannot be precisely obtained. In this case, the scale in the direction Z can be corrected in the same manner as in the general rough alignment by using the following expression (5).

$$E(si, \alpha i, ti) = \sum_{k} |M_k(si, \alpha i, ti, \chi) - c_k|^2 + \gamma \left[ s_3 - \frac{1}{2}(s_1 + s_2) \right]^2 \qquad (5)$$

[Extraction of Outline and Characteristic Point]

Outlines and characteristic points are extracted on three-dimensional data DT or a two-dimensional image FT in the step #14. In the case where the outlines and characteristic points of a standard model are extracted in advance of the step #14, the outlines and the characteristic points which should be located at the same locations as those of the outlines and characteristic points on the standard model are located on three-dimensional data DT or a two-dimensional image FT corresponding to the three-dimensional data DT (see FIG. 7).

In the case where the outlines and characteristic points are not extracted in advance, they are assigned on the standard model at the same time when they are located on the three-dimensional data DT or the two-dimensional image FT.

[Data Reduction]

Next, in order to reduce number of calculations and errors, the three-dimensional data is reduced by extracting data that are necessary and highly reliable (#15). This data reduction enables to reduce the number of calculations without deforming the shape of the original three-dimensional data.

Unnecessary data such as data for outside an object are eliminated in the data reduction. For example, an area for face of a two-dimensional image is judged in order to maintain only the three-dimensional data corresponding to the area. The area can be judged using differences in the distances from background of the object and parts of the object. The area of the face can be judged by using rough alignment information. In the case where the reliability data is involved in the three-dimensional data, only the data of high reliability are maintained. When data density is high, some of the data are deleted so that the density is uniform.

In the case of deleting data for making the density uniform, only the data satisfying the following expression (6) are maintained.

$$|p^k - \tilde{p}^r| > \frac{r_{det}(p^k) + r_{det}(\tilde{p}^r)}{2} \qquad (6)$$

wherein, $p^k$: construction point;

$\tilde{p}^r$: construction point already used; and $r_{det}(x)$: function which represents density of periphery of a construction point x.

According to the above expression (6), the data $P^k$ is used if the distance between the data Pr already used and the data $P^k$ is more than a predetermined value. [Modification]

Modification of whole of the standard model DS is performed in the step #16. There are used, to determine a general energy function e, an energy function e1 which is defined in association with the distances between the construction points of the three-dimensional data and the surface of the standard model; an energy function e3 which is defined in association with the distances between characteristic points of the standard model and the characteristic points assigned for the three-dimensional data; an energy function e2 which is defined in association with the distances between the outlines of the standard model and the outlines assigned for the three-dimensional data; and an energy function es which is defined to avoid an excessive modification. Thus, the general energy function e determined is evaluated by using the energy function e1, e2, e3 and es. The surface of the standard model is modified in such a manner that the general energy function e becomes the smallest value.

It is preferred to use e1, e2, e3 and es as a general energy function e; however, it is possible to use arbitrarily two functions among e1–e3.

Each of the energy functions will be explained in the following.

[Distance Between Standard Model and Three-Dimensional Data]

Referring to FIG. 8, $P^k$ denotes one of points (a point group) that are comprised in the three-dimensional data DT. The point $Q^k$ indicated in the surface S of the standard model DS is the nearest point from the point $P^k$. The point $Q^k$ is an intersection point that is found by drawing perpendiculars from the point $P^k$ to the surface S. The distance between the point $P^k$ and the point $Q^k$ is evaluated in this step.

The difference energy e1, which represents differences between the points in the three-dimensional data and the surface of the standard model, is determined by the following expression (7) using a square distance of the distance between the point $P^k$ on the three-dimensional data after the data reduction and the point $Q^k$ found by projecting the point $P^k$ on the surface S of the standard model DS.

$$e1(T1^A) = \frac{1}{WL^2}\sum_k w(\rho k)[d^{kT}(Q^k - P^k)]^2 \quad (7)$$

wherein,

T1$^A$: control points;

P$^k$: construction point of three-dimensional data after data reduction;

Q$^k$: projecting point of construction point of three-dimensional data on surface of model;

K: number of construction points after data reduction;

d$^k$: direction of projection from construction point to surface of model: $d^k=(Q^k-P^k)/|Q^k-P^k|$;

ρk: reliability of construction point P$^k$;

w(ρk): reliability function, $w(\rho k)=1/(\alpha+\rho^k)^n$;

W: Σw(ρk); and

L: adjusting scale that enables to handle various energy by one common unit.

[Distance between Outline of Standard Model and Outline of Measured Data]

In this step, there are evaluated distance between an outline assigned on three-dimensional data or an outline assigned on two-dimensional image and an outline on a standard model.

When the outline of the measured data is assigned on the three-dimensional data, the distance therebetween is determined by drawing perpendiculars from points on the outline of the three-dimensional model to the outline on the standard model which corresponds to the outline of the three-dimensional data and selecting the shortest perpendicular as the distance. In addition, a plurality of points are assigned on the outline.

In the case where the outline of the measured data is assigned on the two-dimensional image, the outline of the standard model is projected on the two-dimensional image by using camera parameters for the camera which has captured the two-dimensional image. Distance is determined by drawing perpendiculars from points on the outline of the two-dimensional image to the outline of the standard model that corresponds to the outline of the two-dimensional image and selecting the shortest perpendicular as the distance. In addition, a plurality of points are assigned on the outline.

In the case where the outline of the measured data is assigned on the three-dimensional data, e2 which represents difference energy of respective outlines of the standard model is calculated by the following expression (8) using sum of squares of the distances.

$$e2(T2^A) = \frac{1}{nl^2}\sum_{k=1}^{n}[d^{kT}(qk - pk)]^2 \quad (8)$$

wherein,

T2$^A$: control points;

pk: point on outline on three-dimensional data;

qk: pedal point of perpendicular line drawn from point on outline of three-dimensional data to corresponding model outline;

n: number of points on outline of three-dimensional data associated with one model outline;

d$^k$: direction of projection of outline of measured data to corresponding model outline, $d^k=(qk-pk)/|qk-pk|$; and l: adjusting scale for handling various types of energy by one common unit.

In the case where the outline of the measured data is assigned on the two-dimensional image, e2' which is the difference energy of respective outlines of the standard model is calculated by the following expression (9).

$$e2'(T2'^A) = \frac{1}{nl^2}\sum_{k=1}^{n}[d^{kT}(qk - pk)]^T \quad (9)$$

wherein,

T2$^A$: control points;

pk: point on outline of two-dimensional image;

qk: pedal point of perpendicular line drawn from point on outline of two-dimensional image to corresponding model outline projected on two-dimensional image;

n: number of points of outline of measured data associated with one model outline;

d$^k$: direction of projection from points on outline of two-dimensional image to corresponding model outline, $d^k=(qk-pk)/|qk-pk|$; and l: adjusting scale for handling various types of energy by one common unit.

Reason for assigning the outline of the measured data on the two-dimensional image is that the outline itself can be inaccurate if the outline is assigned on the three-dimensional data that are ambiguous. Thus, the outline is extracted using the two-dimensional image. (Distance between Characteristic Points on Standard Model and Corresponding Characteristic Points on Measured Data)

Characteristic points are set on the measured data in order to evaluate distances between the characteristic points on the thee-dimensional data or the characteristic points assigned on the two-dimensional image and the characteristic points of the standard model.

Difference energy e3 between the characteristic points on the three-dimensional data and the characteristic points on the standard model is calculated from the following expression (10) by using a square distance of the distance between corresponding characteristic points.

In the case where the characteristic points are assigned on the two-dimensional image, the difference energy on the two-dimensional image is calculated by projecting the characteristic points of the standard model on the two dimensional image using camera parameters.

$$e3(T3^A) = \frac{1}{NL^2}\sum_{k=1}^{N}|F^k - G^k|^2 \quad (10)$$

wherein,

T3$^A$: control points;

F$^k$: characteristic point of measured data;

G$^k$: characteristic point on standard model corresponding to characteristic point of measured data;

N: number of characteristic points on standard model and characteristic points of measured data corresponding to each other; and L: adjusting scale for handling various types of energy by one common unit.

[Stabilization Energy for Avoiding Excessive Modification]

In addition to the difference energy mentioned above, a stabilization energy es is used for avoiding an excessive modification.

Specifically, distances between control points used for modification are connected by virtual springs (elastic bars) KB as shown in FIG. 9. Based on restrictions of the virtual springs KB, the stabilization energy es for stabilizing the shape of the surface S of the standard model DS is defined.

The virtual springs do not necessarily connect the control points, but relationship between the control points and the virtual springs must be definite.

Part of the surface S of the standard model DS, which is an object for fitting, is shown in FIG. 9. The surface S is formed of control points U={ui, i=1 . . . N}. A virtual spring KB is provided between neighboring control points. The virtual spring KB restrains the control points by tensile force and serves to prevent the surface S from improper modification.

Specifically, the tensile force of the virtual spring KB is increased with the increase in an interval between neighboring control points u. For example, the tensile force of the virtual spring KB increases when the point $Q^k$ approaches the point $P^k$, and the interval between the control points U increases in accordance with the movement of the point $Q^k$. The tensile force of the virtual spring KB does not change when the movement of the point $Q^k$ does not affect the interval of the control points U, i.e., when relative position relationship between the control points U does not change. The stabilization energy es is defined as an average tensile force of the virtual springs KB on the whole surface S. Accordingly, the stabilization energy es increases when a part of the surface S is excessively modified. The stabilization energy es is null when the surface S is uniformly modified.

The stabilization energy es is determined by the following expression (11) depending on the state of deformation of the virtual spring KB.

$$es(Ts^A) = \frac{c}{ML^2} \sum_{m=1}^{M} \left[ \frac{1}{L_0^m} (\tilde{U}^m - \tilde{V}^m)^T (U^m - V^m) - L_0^m \right]^2 \quad (11)$$

wherein, $T3^A$: control points;

$\tilde{U}^m$, $\tilde{V}^m$: initial value of edge (control point) of virtual spring;

$U^m$, $V^m$: edge of virtual spring after modification;

$L_0^m$: length of virtual spring in initial state, $$L_0^m = |\tilde{U}^m - \tilde{V}^m|$$

M: number of virtual springs;

c: spring coefficient; and

L: adjusting scale for handling various types of energy by one common unit.

Therefore, the virtual spring KB is hardly deformed if the spring coefficient c is large.

The stabilization energy function es serves as a certain restraint for modification of the surface S and thus enables to prevent the surface S from an excessive modification.

[General Energy Function]

As described in the foregoing, the control points $T1^A$, $T2^A$, $T3^A$ and $Ts^A$ are used for the energy functions e1, e2, e3 and e4, respectively. Although the identical control points $T1^A$–$Ts^A$ are used in the foregoing, control points different from one another can be used as mentioned below. The standard model is modified using the different control points $T^A$, and the control points $T^A$ as represented by the expression (12) which can minimize the general energy function $e(T^A)$ is determined.

$$e(T^A) = w1e1(T^A) + \sum_s w2e2^S(T^A) + w3e3(T^A) + ces(T^A) \quad (12)$$

wherein, $e1(T1^A)$: difference energy between construction points of three-dimensional data and surface of model;

$e2(T2^A)$: difference energy between model outline and outline of measured data;

$e3(T3^A)$: difference energy between characteristic point of measured data and characteristic point of model;

$eS(TS^A)$: stabilization energy for avoiding excessive modification;

wi, c: weight parameters for respective energy; and $T^A = T1^A = T2^A = T3^A = TS^A$.

[Modification]]

Specifically, modification is performed in the manner shown in FIG. 3. Namely, the modification is performed by changing the control points. Assuming that the general energy function after n-th modification is $en(T^A)$, the general energy function $en(T^A)$ is considered to be converged when the following expression is satisfied.

$$|en(T^A) - en-1(T^A)| < \epsilon \quad (13)$$

Hereinafter, a general modification process is explained with reference to FIG. 3. Firstly, a pair of corresponding points between the measured data and the standard model is prepared (#21).

The surface S is modified (#22), and the general energy function $en(T^A)$ after the modification is calculated (#23). Until the general energy function $en(T^A)$ is converged (until it is "YES" in #24), the process is repeated.

There may be employed a known method for judging the convergence of the general energy function $en(T^A)$ such as a method wherein the convergence is confirmed when the general energy function $en(T^A)$ is smaller than a predetermined value and a method wherein the convergence is confirmed when degree of change from the previous calculation is smaller than a predetermined value.

[Different Control Points]

In the expression (12), the same control points are used for the different energy functions e1–e4 having different objects for fitting (e.g., construction points of three-dimensional data, outline, characteristic point). In turn, control points are varied for each object for fitting, i.e., for each energy functions in the following example. Specifically, in the following example, different control points $T1^A$, $T2^A$, $T3^A$ and $TS^A$ are used.

In this case, the expression (12) can be used as the general energy function $e(T^A)$ as long as the control points $T1^A$, $T2^A$, $T3^A$ and $TS^A$ are different from one another and in the following relationship.

$$T^A \supset T1^A$$

$$T^A \supset T2^A$$

$$T^A \supset T3^A$$

$$T^A = TS^A$$

As mentioned above, movement due to energy between the characteristic points is topical in nature since the characteristic points are topical (as points usually are). For example, in aligning the position of an eye of three-dimensional data and the position of an eye of a standard model, undesired modification may occur if a part where characteristic points are set is strongly pulled. Such undesirable modification should be avoided.

In turn, the construction points of the three-dimensional data need to be located to realize delicate movement. However, in the case where the control points are scarcely set, the construction points cannot move delicately.

Therefore, it is preferred to use a large number of control points with respect to the construction points of the three-dimensional data and a small number of control points with respect to the characteristic points. An intermediate number of control points are used for the outline.

The control points are set with high density for an outline that has a steep or jagged form. The stabilization energy must be applied to all the control points. The selection of control points as mentioned above is performed in preparation for the standard model.

The control points $T1^A$, $T2^A$, $T3^A$ and $TS^A$ are different from one another; however, control points included in each of the $T1^A$, $T2^A$, $T3^A$ and $TS^A$ can be used in common.

[Change in Weight Depending on Reliability]

In the expression (12), the general energy function $e(T^A)$ is evaluated assuming that reliabilities of information are equal to one another; however, in this example, weights are changed depending on the reliabilities of the information. Thus, it is possible to judge $e(T^A)$ with counting strongly the information of high reliability.

The reliability of respective information can be obtained in the three-dimensional measurement or automatic extraction of outlines and characteristic points.

In this case, control points (TA) which can minimize the general energy function e(TA) represented by the expression (14) is determined.

$$e(T^A) = w1W1(\rho1)e1(T^A) + \sum_s w2W2(\rho2^s)e2^2(T^A) + w3W3(\rho3)e3(T^A) + ces(T^A) \quad (14)$$

wherein,

ρi: reliabilities of information regarding respective energy functions $ei(T^A)$;

W(ρi): reliability function; and $T^A = T1^A = T2^A = T3^A = TS^A$.

According to the first embodiment, the fitting is conducted by using not only the construction points of three-dimensional data and two-dimensional image but also the outlines and characteristic points thereof, so that a part such as a corner of an eye or a corner of a mouth is well conformed to that of an object without topical improper modification and that the precision of the fitting using the three-dimensional data and the like is maintained. Thus, according to the first embodiment, it is possible to generate a three-dimensional model improved in resemblance to the object.

Especially, according to the first embodiment, modification free from inconsistency with texture information is achieved even in the field of computer graphics where the standard model is subjected to partial modification.

[Second Embodiment]

Figure 11:
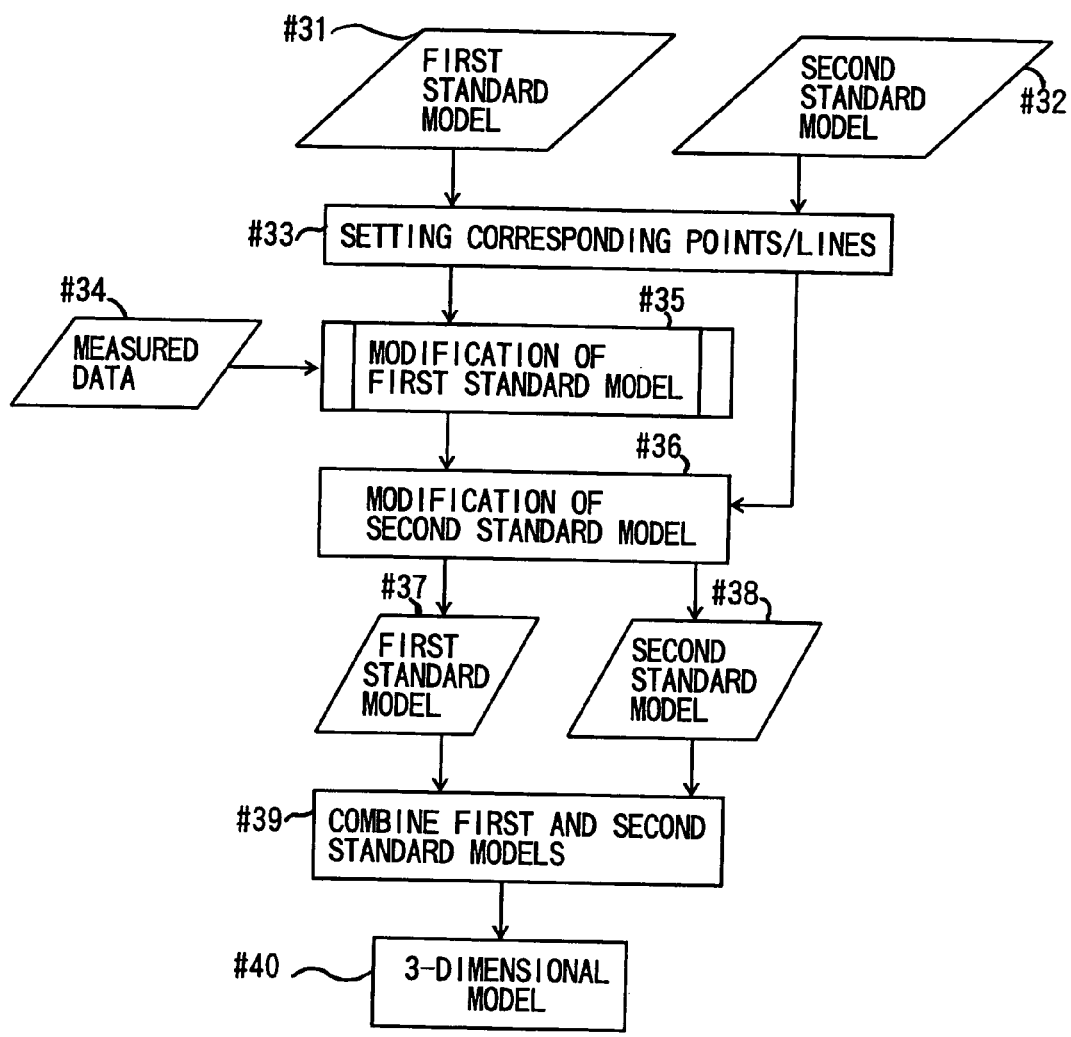
FIG. 11 is a flowchart for showing processing of a modeling device according to a second embodiment of the present invention.
Figure 12:
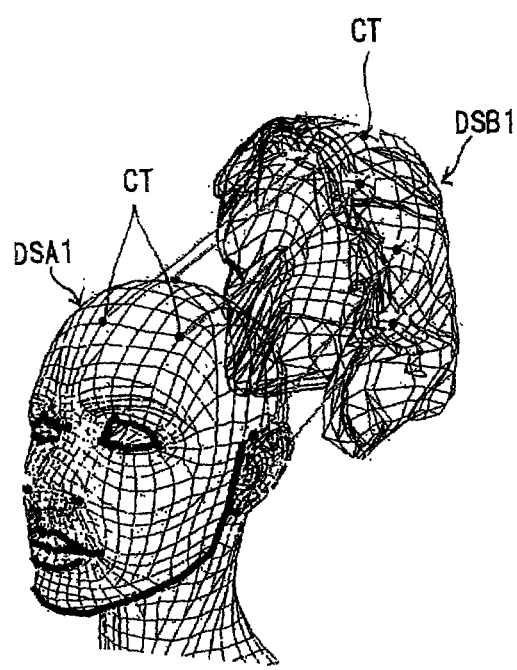
FIG. 12 shows an example of a face standard model and a hair standard model wherein corresponding points relate them to each other.
Figure 13:
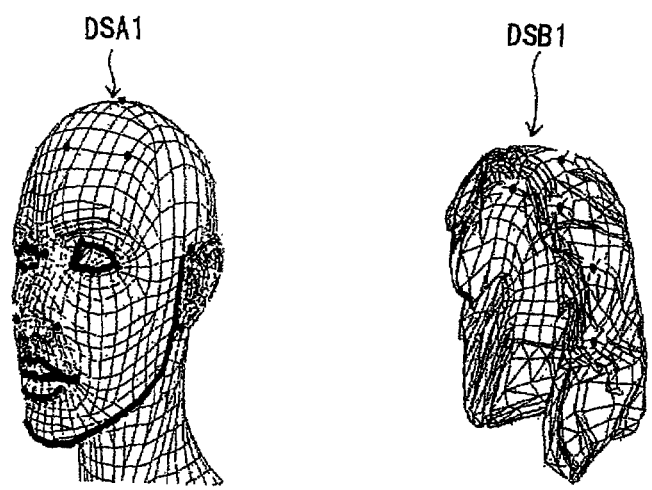
FIG. 13 shows an example of the face standard model and the hair standard model of FIG. 12 after modification.
Figure 14:
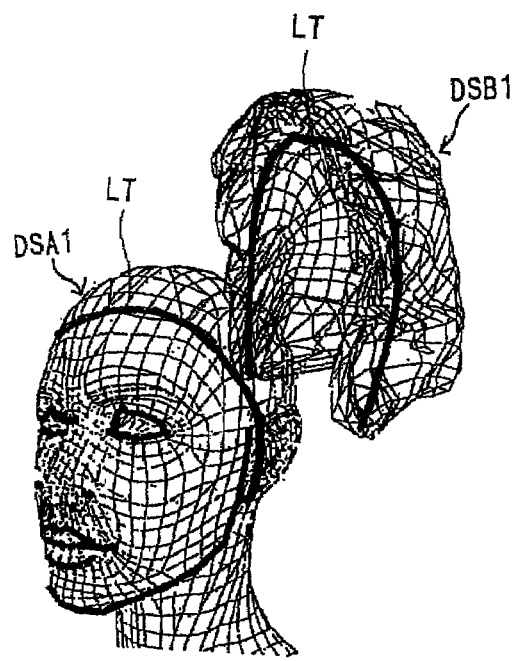
FIG. 14 shows an example of a face standard model and a hair standard model wherein corresponding points relate them to each other.
Figure 15:
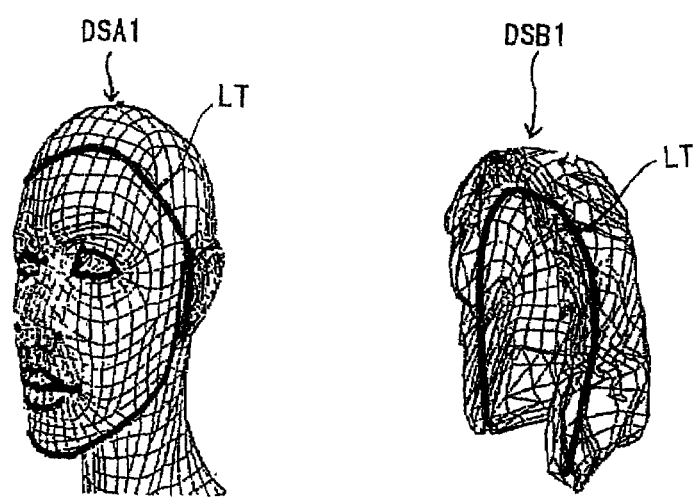
FIG. 15 shows an example of the face standard model and the hair standard model of FIG. 14 after modification.

FIG. 11 is a flowchart which shows processing of the modeling device 11 according to a second embodiment of the present invention. FIG. 12 shows an example of a face standard model and a hair standard model wherein correspondences therebetween are indicated by corresponding points. FIG. 13 shows an example of the face standard model and the hair standard model of FIG. 12 after modification. FIG. 14 shows an example of a face standard model and a hair standard model wherein correspondence therebetween is indicated by corresponding lines. FIG. 15 shows an example of the face standard model and the hair standard model of FIG. 14 after modification.

Particulars described in relation to the first embodiment and those shown in FIGS. 1 to 10 are also applied to the second embodiment. For example, the modeling device 1 shown in FIG. 1 is used in the second embodiment. For fitting a face standard model, the processing described in the first embodiment such as the step of preparing standard model (#11), the step of obtaining three dimensional data (measured data) (#12), the step of rough alignment (#13), extraction of outlines and characteristic points (#14), the step of reducing data (#15) and the step of modifying a standard model (#16) are performed in the second embodiment. Therefore, the particulars described in the first embodiment are omitted or simplified in the second embodiment.

In the second embodiment, face standard model DSA is prepared as a first standard model and hair standard model DSB is prepared as a second standard model as shown in FIG. 11 (#31 and #32). The standard models DSA and DSB are related to each other by means of corresponding points or corresponding lines (#33).

Measured data of human head are obtained in the step #34. The face standard model DSA is modified in accordance with the measured data of human head (#35). The modification process of the step #35 is performed in the order of the flowchart of FIG. 3, for example. The hair standard model DSB is modified by using position information of corresponding points or corresponding lines after the above modification (#36). Thus, the standard model DSA and DSB after modification are obtained (#37 and #38). The modified standard model DSA and DSB are combined (#39), to thereby obtain three-dimensional model ML of human head (#40). Detailed description of the second embodiment is given in the following.

Referring to FIG. 1, first standard models of face (group A) and second standard models of hair (group B) are prepared as standard models DS. The group A contains a plurality of face standard models (DSA). The group B contains a plurality of hair standard models (DSB). The standard models DSA and DSB are related to each other by corresponding points or corresponding lines.

In the course of preparing standard models DS of an object, the face standard model DSA and the hair standard model DSB are prepared. The preparation of standard models DS is performed by selecting, from the standard models stored in the magneto-optic disk unit 11, a standard model suitable for the object. An example of the hair standard model DSB1 is shown in FIGS. 12 and 14, respectively, along with an example of the step of relating the hair standard model DSB1 to the face standard model DSA.

In the second embodiment, the face standard model DSA is subjected to a fitting to measured data and then the face standard model DSA after the fitting is combined with the hair standard model DSB.

As described in the foregoing, corresponding points CT or corresponding lines LT are set for the face standard model DSA and the hair standard model DSB, and the corresponding points CT or the corresponding lines LT are superimposed to each other so that the DSA and the DSB are combined to form a natural shape. In addition, control points are set on the hair standard model in the same manner as that of the face standard model.

In the case where the standard model DSA is modified by the fitting, amounts of modification of the corresponding points CT or the corresponding lines LT is detected to be applied to an amount of modification of the corresponding points CT or the corresponding lines LT of the standard model DSB. In this case, in order to eliminate mismatch between the shape of the standard model DSB and the shape of the modified standard model DSA, points on the standard model DSB are modified in accordance with the amounts of modification of the characteristic points of the modified standard model DSA.

In the case of modification using the corresponding lines LT as shown in FIG. 14, the standard model DSB1 is modified by, for example, drawing shortest perpendicular lines from points on the corresponding lines LT of the face standard model DSA1 to the corresponding lines LT of the hair standard model DSB1 and then superimposing the points of the face standard model DSA1 to the points of the hair standard model DSB1.

The hair standard model DSB is modified corresponding to the modification of the face standard model DSA as described above. Examples of the modified standard models DSA1 and DSB2 are shown in FIG. 13.

Thus, the dislocation of the standard model DSA and the standard model DSB is eliminated, whereby the standard models DSA and DSB are combined without gaps therebetween and fitted to each other without causing incongruity.

In addition, in the case of the modification of the standard model DSB, it is possible to use measured data (three-dimensional data or an two-dimensional image) of the standard model which has been subjected to fitting together with the amount of modification of the corresponding points or the corresponding lines of the standard model DSB.

In the case of replacing standard model DSB after the selection with another standard model DSB, the newly selected standard model DSB can be modified in the same manner as described above to be combined with the standard model DSA after fitting.

Evaluation expression for the modification of hair standard model DSB is as follows.

In the case of setting correspondences by using points, the above-mentioned expression (10) is used, wherein the parameters are as follows.

$T3^A$: control points of hair standard model (second standard model);

$F^k$: corresponding points after modification on face standard model (first standard model);

$G^k$: corresponding points of hair standard model corresponding to $F^k$;

N: number of correspondences of $F^k$ and $G^k$; and

L: scaling parameters for adjusting energy.

In the case of setting the correspondences using lines, the above-mentioned expression (8) is used, wherein parameters are as follows.

$T2^A$: control points of hair standard model (second standard model);

pk: points on corresponding lines after modification of face standard model (first standard model);

qk: points on corresponding lines of hair standard model corresponding to pk;

n: number of corresponding points between pk and qk;

$d^k$: distance between points on corresponding line of face standard model and corresponding lines of hair standard model in projection direction; and l: scaling parameters for adjusting energy.

According to the second embodiment, the following effects are achieved in addition to the effect achieved by the first embodiment. Namely, the face standard model DSA and the hair standard model DSB can be fitted to each other without incongruity since dislocation of the face standard model DSA and the hair standard model DSB is eliminated by modifying the hair standard model DSB in accordance with the modification of the face standard model DSA after relating the face standard model DSA to the hair standard model DSB using corresponding points CT.

According to the second embodiment, it is thus possible to achieve satisfactory fitting of hair part, etc. in generating a three-dimensional model of human head.

In the second embodiment, corresponding points or corresponding lines may be so defined as to relate a two-dimensional face model to a plurality of hair models. In this case, a face image is inputted first and then the face model is modified to conform to the face image. In this case, a simulation of the hair model is performed in such a manner that an amount of modification of corresponding points or corresponding lines set on the face model is applied to corresponding points or corresponding lines of the hair model for modifying the hair model.

Further, in the case of using CAD system, correspondences between objects may be defined by using points or lines so that the objects are modified in such a manner that one of the objects is modified and then the other object is modified in accordance with an amount of modification of the corresponding points or lines of the former. By this method, workload in designing can be reduced.

[Third Embodiment]

Figure 16:
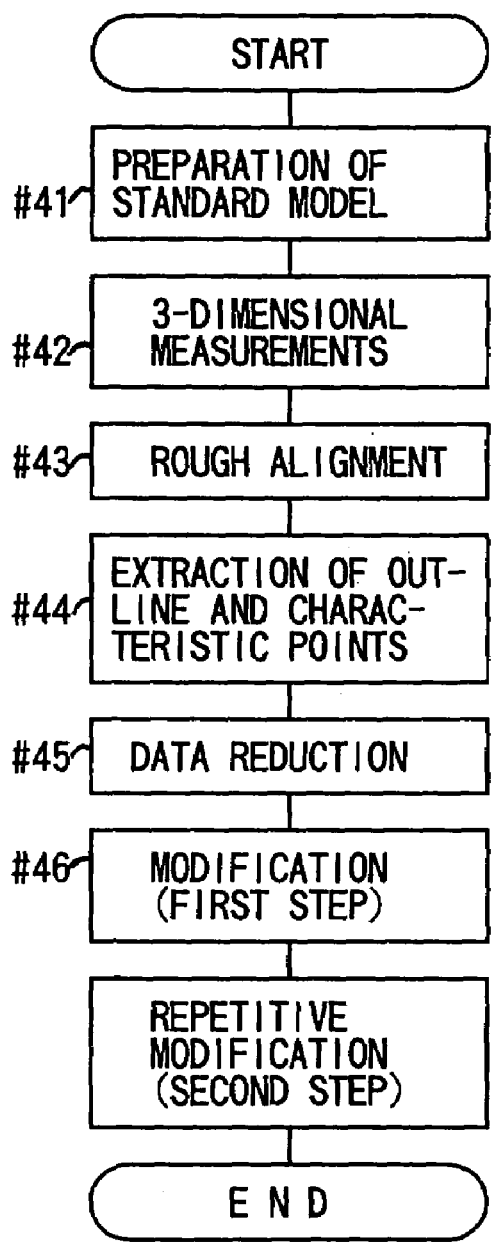
FIG. 16 is a flowchart showing a general processing of a modeling device according to a third embodiment of the present invention.
Figure 17:
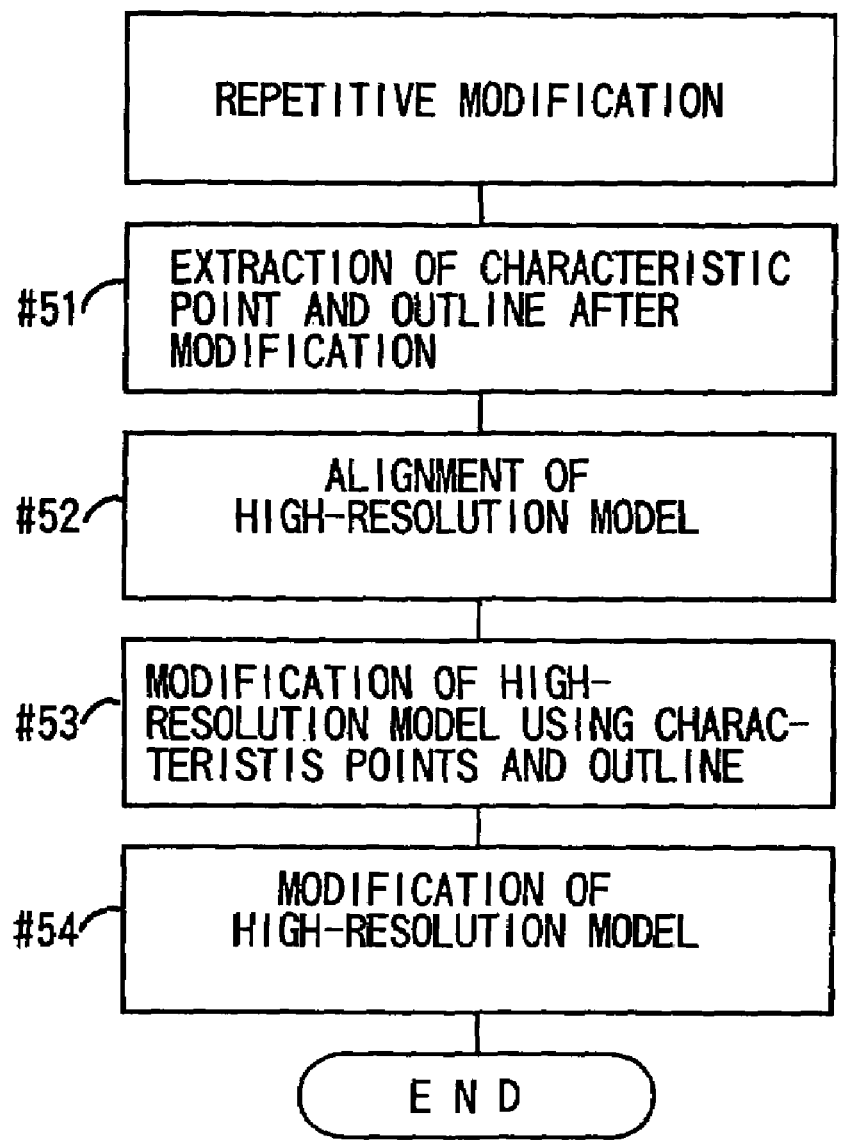
FIG. 17 is a flowchart showing a repetitive modification of a high-resolution standard model DSE.
Figure 18:
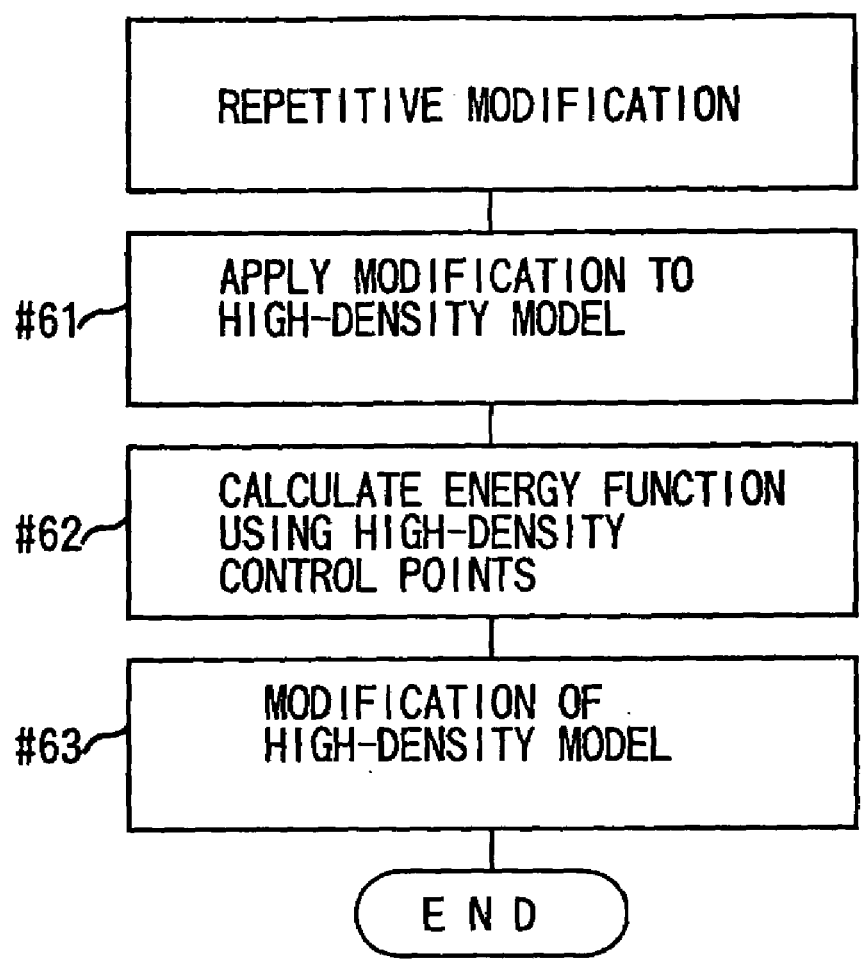
FIG. 18 is a flowchart showing a repetitive modification of high-density standard model DSF.
Figure 20:
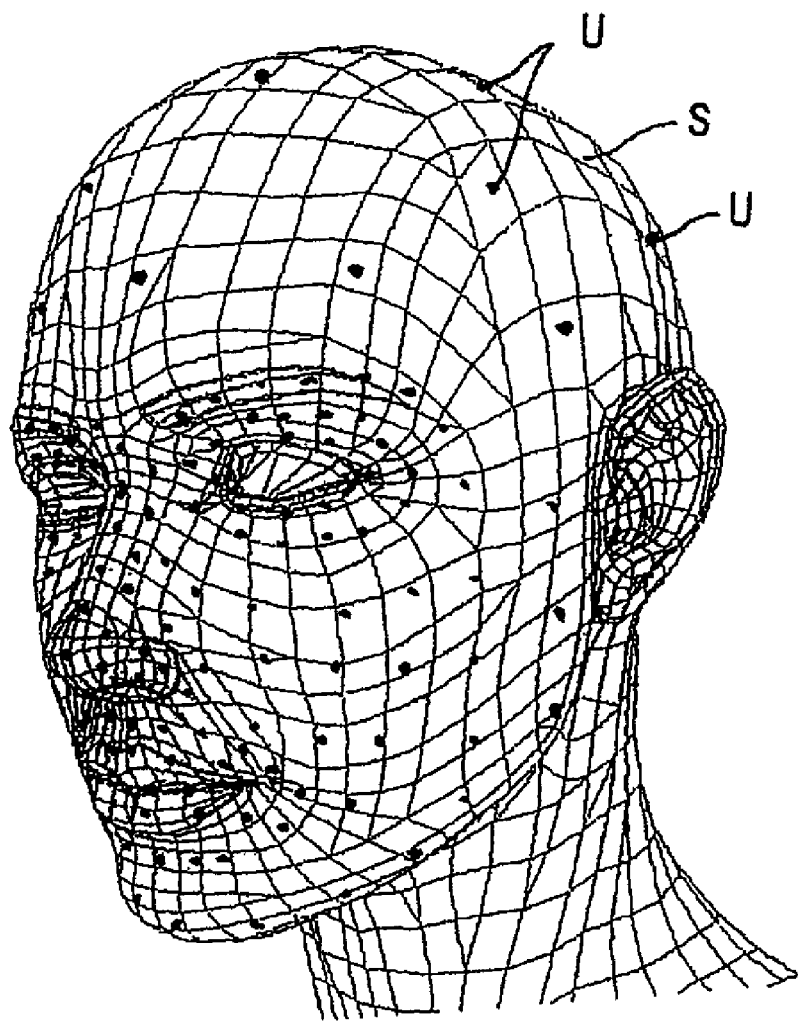
FIG. 20 shows an example of a low-density model.

FIG. 16 is a flowchart showing a general processing of a modeling device according to a third embodiment of the present invention. FIG. 17 is a flowchart showing a repetitive modification processing of high-resolution standard model DSE. FIG. 18 is a flowchart showing a repetitive modification processing of high-density standard model DSF. FIG. 19 shows an example of a simplified model. FIG. 20 shows an example of a low-density model. In addition, FIG. 17 shows an example of modification of a high-resolution model based on results of modification of a low-resolution model, and FIG. 18 shows an example of modification of a standard model wherein the standard model is modified by using low-resolution control points and the modified standard model is then modified by using high-resolution control points. Particulars described in the first embodiment and relative parts of particulars shown in FIGS. 1 to 10 are applied to the third embodiment. Therefore, descriptions of the same particulars as that of the first embodiment are omitted or simplified.

Two fitting methods as described below are included in the third embodiment.

(1) Modification is repeated by varying resolution. More specifically, regular model DSE having a large number of construction points (i.e. of high resolution) and simplified model DSK having less construction points (i.e. of low-resolution) are used as standard models DS. The simplified model DSK is generated by reducing the construction points from the regular model DSE. In this fitting method, fitting using the simplified model DSK is performed followed by modification of the regular model DSE with using modification information obtained by the fitting. In this specification, the simplified model is sometimes referred to as "low-resolution model", and the regular model is sometimes referred to as "high-resolution model".

(2) Modification is repeated with varying density of control points. More specifically, standard model DS is modified by manipulating its control points. A large number of control points may be set, but the standard model DS is firstly modified by using a part of the set control points, i.e. a small number of control points. The modified standard model DS is then modified by using a larger number of the control points, for example, the whole control points. Low-density control points are used in the former modification and high-density control points are used in the latter modification. In this specification, standard model DS which is modified by using the low-density control points is sometimes referred to as "low-density model DSL", and standard model DS which is modified by using high-density control points is sometimes referred to as "high-density model DSF". Especially, in the case where standard model DS is sometimes referred to as "regular model DSF" when it is modified by using all the control points; however, these designations are made for convenience in this specification and not for meaning that plural standard models are used for one modification.

As shown in FIG. 16, the standard model DS is prepared firstly (#41). In the third embodiment, the regular model DSE and the simplified model DSK or the low-density model DSL and the regular model DSF are prepared. Other processing in the step #41 and processing in the steps #42 to #45 are the same as that of the steps #11 to #15 in the first embodiment.

In the step #46, modification of the standard model DS is performed. Processing in the step #46 is the same as that of the step #16 mentioned above except that the standard model DS as an object for the processing in the step #46 is either the simplified model DSK or the low-density model DSL. Specifically, the simplified model DSK undergoes the modification processing of the step #46 in the method (1), and the low-density model DSL undergoes the processing of the step #46 in the method (2).

Next, repetitive modification is performed (#47). In the repetitive modification, the processing of the step #46 described above is repeated to modify the standard models DS, where resolution and density of control points of the standard model DS are varied in each processing.

More specifically, in the case of modifying the standard model DS with varying its resolution, the low-resolution standard model (simplified model) DSK is subjected to the modification processing of the step #46 in the first step. In the second step, information obtained by the first step is applied to modification of the high-resolution regular model DSE.

In the case of performing modification with varying the density of control points, the low-density model DSL is subjected to the modification processing of the step #46 in the first step to achieve a general fitting, and then the high-density regular model DSF is modified in the second step to achieve a precise fitting. In addition, the convergence parameters of integrated energy function are changed with respect to the first step and the second step.

Thus, time for operation is minimized and topical forms of an object are reproduced with high precision as well as the general shape is conformed to that of the object, thereby obtaining a three-dimensional model of high precision. The above-mentioned processing is described in detail as follows.

(1) Repetitive Modification with Varying Resolution

The simplified model DSK1 shown in FIG. 19 is used as the simplified model DSK, for example.

Referring to FIG. 19, the simplified model DSK1 is prepared by reducing construction points of the standard model DS shown in FIG. 4 to make a polygon coarse. The resolution is reduced by reducing the construction points. For example, if the standard model DS has 10 thousands of construction points, the simplified model has about a several hundreds of the construction points. Therefore, the simplified model DSK is sometimes referred to as a low-resolution model. In turn, the standard model DS is sometimes referred to as a detail model. In addition, number of control points in the simplified model DSK is also reduced.

For example, in the case where the standard model DS has about ten thousands of construction points, the simplified model DSK has about a several hundreds of construction points.

Characteristic points TT and control points u are set on the simplified model DSK1. The characteristic points TT of the simplified model DSK1 is related to characteristic points TT of the standard model DS, and they are used for receiving and giving information of modification. However, number of the characteristic points of the simplified model DSK1 is not always the same as that of the standard model DS and is generally smaller.

Accordingly, the simplified model DSK1 is subjected to modification in the first step of modification processing (#46). Repetitive modification is then performed in the step #47. Processing in the repetitive modification is shown in FIG. 17.

In the step #51, characteristic points TT and outline RK after modification are extracted from the modified simplified model DSK.

In the step #52, alignment of the regular model DSE is performed by using the expression (5) for information of alignment of the simplified model DSK.

The characteristic points TT and the outline RK of the simplified model DSk extracted in the step #51 are related to the characteristic points TT and the outline RK of the regular model DSE, and then energy calculation is performed by using the expressions (9) and (10). Then, processing shown in FIG. 3 is performed to modify the regular model DES in order to reduce the energy (#53).

Energy calculation of the expression (14) is performed by using the characteristic points TT and the outline RK of the simplified model DSK and reduction data obtained by the expression (6). Then, the processing shown in FIG. 3 is performed to modify the regular model DSE in order to reduce the energy (#54).

(2) Repetitive Modification with Varying Density

Low-density model DSL1 shown in FIG. 20 is used as a low-density model DSL, for example.

The low-density model DSL1 in FIG. 20 is prepared by reducing the density of the standard model of FIG. 4 by reducing number of control points u thereof. Number of constriction points is the same as that of the standard model DS.

Accordingly, the low-density model DSL is subjected to modification in the first step of modification processing (#46). In the step #47, the repetitive modification is performed. The repetitive modification is shown in FIG. 18.

In the step #61, modification of the simplified model DSk is applied to the high-density model DSF. Energy calculation of the expression (14) is performed with respect to control points $T^{t4}$ of the high-density model DSF (#62).

Then, the processing shown in FIG. 3 is performed to modify the high-density model DSF in order to reduce the energy (#63).

Thus, a general shape of he low-density model DSL is conformed to that of an object by using coarse control points $T^{t4}a$ in the first step. The shape is then precisely conformed to that of the object in the second step by increasing density of over-all control points or by using delicate control points $T^{t4}b$ wherein number of control points of parts which require specially precise conformity is increased. Thus, time for operation can be shortened. If a larger number of control points are used for modification from the start, it is highly possible to waste time by performing operations.

Further, only a general shape is conformed to that of the object in the first step in order to avoid improper modification. In addition, if a precise modification is performed by using the regular models DSE and DSF in the first step, it is highly possible that such modification leads to improper modification.

In the foregoing embodiments, the structure of the modeling device 1, circuit, contents of processing, order of processing, timing of processing, settings of factors, etc. can be varied as required without changing the scope of the present invention.

What is claimed is:

1. A method for modifying a standard model based on measured data, comprising the steps of:
    modifying the standard model prepared in advance of modification in accordance with the measured data and deciding whether to further modify the standard model or to finish the modification of the standard model based on integrated evaluation of two or more functions selected from a first function relating to a distance between the standard model and the measured data, a second function relating to a distance between a characteristic point defined on the standard model and a characteristic point specified on the measured data and corresponding to the characteristic point defined on the standard model and a third function relating to a distance between an outline defined on the standard model and an outline specified on the measured data and corresponding to the outline on the standard model.

2. The method according to claim 1, wherein
    the first function, the second function and the third function are energy functions,
    the integrated evaluation is performed by evaluating a total value of two or more energy functions, and
    the modification is completed and a shape model is produced when it is judged that the total value is converged.

3. The method according to claim 2, wherein
    an energy function is defined as a fourth function for avoiding excessive modification of the standard model,
    the integrated evaluation is performed by evaluating a total value of the four functions, and
    the modification is completed and a shape model is produced when it is judged that the total value is converged.

4. The method according to claim 1, wherein weight in the integrated evaluation is determined based on:
    the measured data when the first function is used for the integrated evaluation;
    the characteristic point specified on the measured data when the second function is used for the integrated evaluation; or
    the outline specified on the measured data when the third function is used for the integrated evaluation.

5. A method for modifying a standard model on which a plurality of control points are defined based on measured data, comprising the steps of:
    modifying the standard model which is prepared in advance of modification based on the measured data, wherein the standard model is modified by manipulating control points on the standard model; and
    deciding whether to further modify the standard model or to finish the modification of the standard model based on integrated evaluation of a first function relating to a distance between whole or a part of the standard model to be modified based on a first control points of the plurality of control points and a part of the measured data corresponding to the whole or a part of the standard model and a second function relating to a distance from a part of the standard model to be modified by a second control points of the plurality of points and a part of the measured data corresponding to the part of the standard model.

6. A method for generating a three-dimensional model of an object, comprising the steps of:
    preparing measured data and a standard model of the object; and
    modifying the standard model in accordance with the measured data, wherein
    it is decided whether to further modify the standard model or to finish the modification of the standard model based on integrated evaluation of two or more functions selected from a first function relating to a distance between the standard model and the measured data, a second function relating to a distance between a characteristic point defined on the standard model and a characteristic point specified on the measured data and corresponding to the characteristic point defined on the standard model and a third function relating to a distance between an outline defined on the standard model and an outline specified on the measured data and corresponding to the outline on the standard model.

* * * * *